US012583044B2

(12) United States Patent
Winking et al.

(10) Patent No.: US 12,583,044 B2
(45) Date of Patent: Mar. 24, 2026

(54) METHOD FOR PRODUCING WELDED CONNECTIONS AND AN AUXILIARY DEVICE

(71) Applicant: GEA TDS GmbH, Sarstedt (DE)

(72) Inventors: Kevin Winking, Stadtlohn (DE);
Carsten Isferding, Ahaus (DE);
Wolfgang Jäckering, Emsburen-Berge (DE); Ralf Speemann, Altenberge (DE); Andreas Schmied, Dulmen (DE);
Ludger Tacke, Velen (DE)

(73) Assignee: GEA TDS GmbH, Sarstedt (DE)

( * ) Notice: Subject to any disclaimer, the term of this patent is extended or adjusted under 35 U.S.C. 154(b) by 804 days.

(21) Appl. No.: 17/910,624

(22) PCT Filed: Feb. 5, 2021

(86) PCT No.: PCT/EP2021/000014
§ 371 (c)(1),
(2) Date: Sep. 9, 2022

(87) PCT Pub. No.: WO2021/180355
PCT Pub. Date: Sep. 16, 2021

(65) Prior Publication Data
US 2023/0126017 A1    Apr. 27, 2023

(30) Foreign Application Priority Data

Mar. 11, 2020    (DE) ......................... 102020001599.9

(51) Int. Cl.
*B23K 9/028*    (2006.01)
*B23K 9/00*    (2006.01)
(Continued)

(52) U.S. Cl.
CPC .......... *B23K 9/0288* (2013.01); *B23K 9/0026* (2013.01); *B23K 9/0284* (2013.01); *B23K 2101/06* (2018.08); *B23K 2101/14* (2018.08)

(58) Field of Classification Search
CPC .. B23K 9/0288; B23K 9/0026; B23K 9/0284; B23K 2101/06; B23K 2101/14
(Continued)

(56) References Cited

U.S. PATENT DOCUMENTS

| | | | |
|---|---|---|---|
| 2,996,600 A | 8/1961 | Gardner, Jr. | |
| 2015/0075759 A1* | 3/2015 | McCandlish | ........... F28F 9/187 |
| | | | 165/173 |
| 2015/0267973 A1* | 9/2015 | Wisen | .................... F28F 9/182 |
| | | | 228/101 |

FOREIGN PATENT DOCUMENTS

| | | |
|---|---|---|
| DE | 15 01 463 A1 | 10/1969 |
| DE | 23 41 808 A1 | 1/1975 |

(Continued)

*Primary Examiner* — Phuong T Nguyen
(74) *Attorney, Agent, or Firm* — Young Basile Hanlon & MacFarlane, P.C.

(57) ABSTRACT

Producing welded connections between inner tubes and tube support plates of a tube bundle for a product-to-product shell-and-tube heat exchanger by means of an auxiliary device is described. A production method includes pressing the end face of a tube support plate against the end face of the inner tubes in the direction of the inner tube longitudinal axes during welding operations with a first form fit, which is effective both radially and axially, immovably fixing the number of inner tubes corresponding to the tube layout pattern to each other by a second, detachable form fit of the auxiliary device, making a circumferential round weld orbit-ally, starting from the plate inner bore and the tube inner bore, in a single pass and continuously from radially inside to radially outside, and detaching and removing the auxiliary device from the welded tube bundle.

11 Claims, 7 Drawing Sheets

(51) Int. Cl.
  *B23K 101/06*          (2006.01)
  *B23K 101/14*          (2006.01)

(58) Field of Classification Search
  USPC ............................. 219/58, 60, 59.1, 60.2, 61
  See application file for complete search history.

(56)                    References Cited

FOREIGN PATENT DOCUMENTS

| | | | |
|----|-------------------|----|---------|
| DE | 10 2011 111 095 A1 | | 2/2013 |
| FR | 2 349 395 A1 | | 11/1977 |
| GB | 1 583 515 A | | 1/1981 |
| JP | 2015-533411 A | | 11/2015 |
| JP | 2020-117121 A | | 8/2020 |
| WO | 2014/060425 A1 | | 4/2014 |

* cited by examiner

10

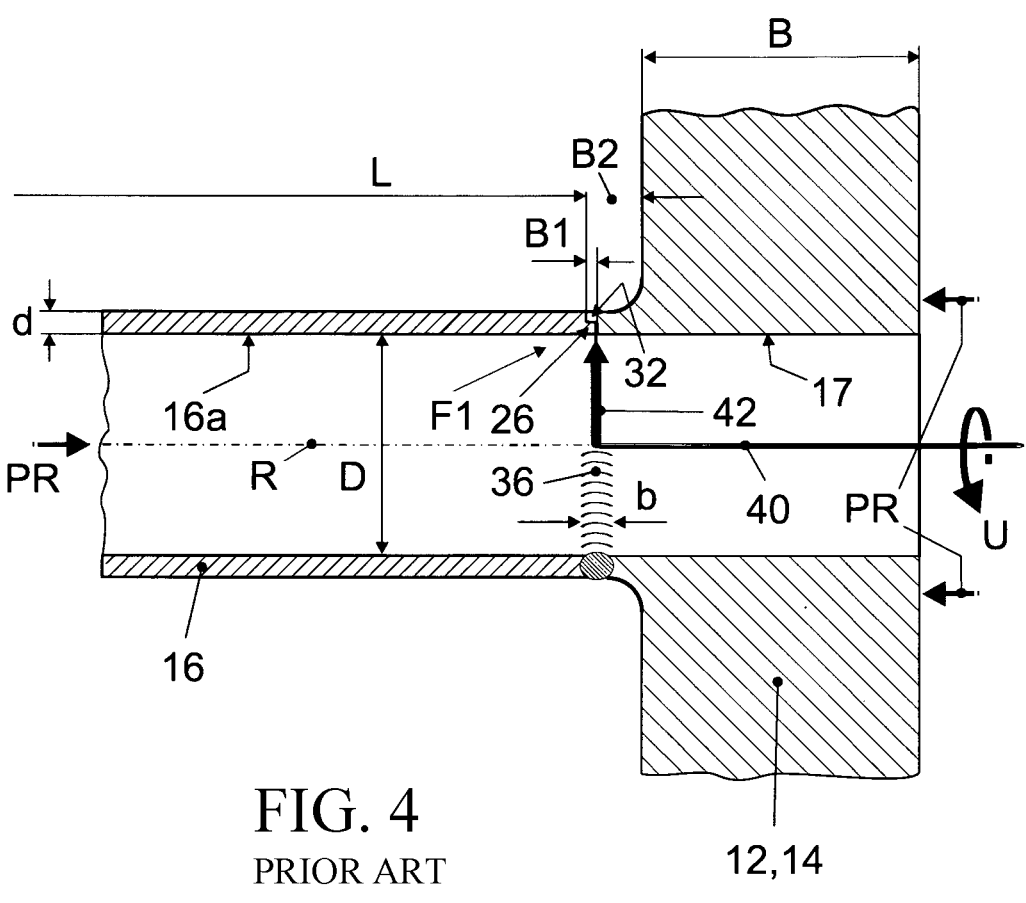
FIG. 4
PRIOR ART
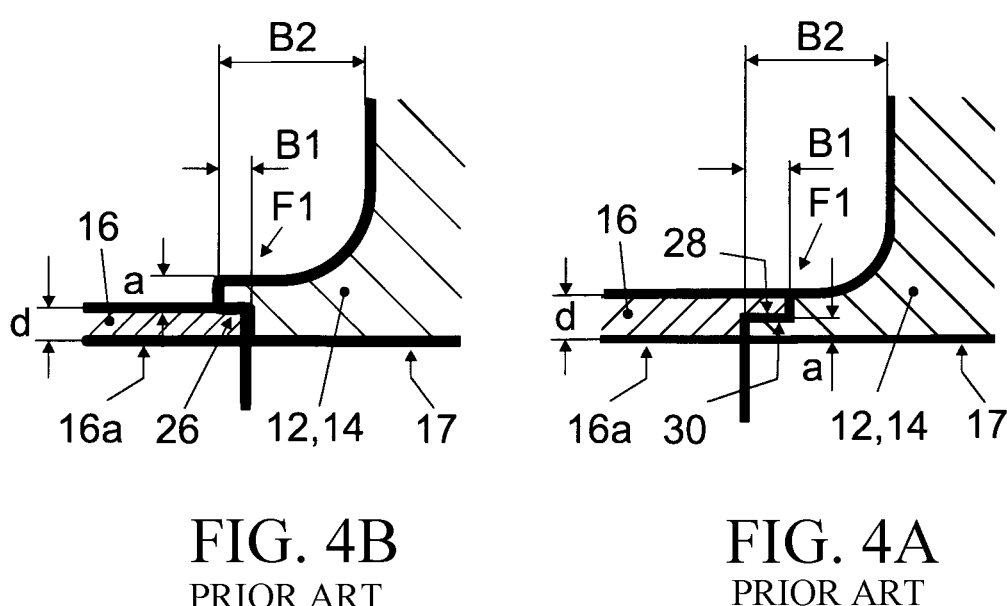
FIG. 4B
PRIOR ART
FIG. 4A
PRIOR ART

FIG. 7B
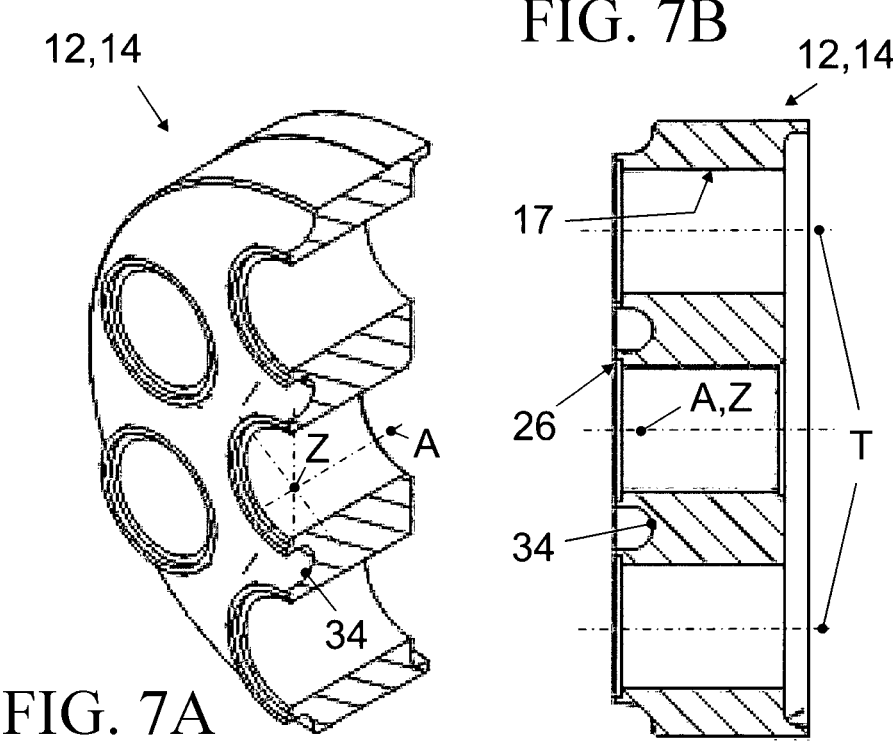
FIG. 7A
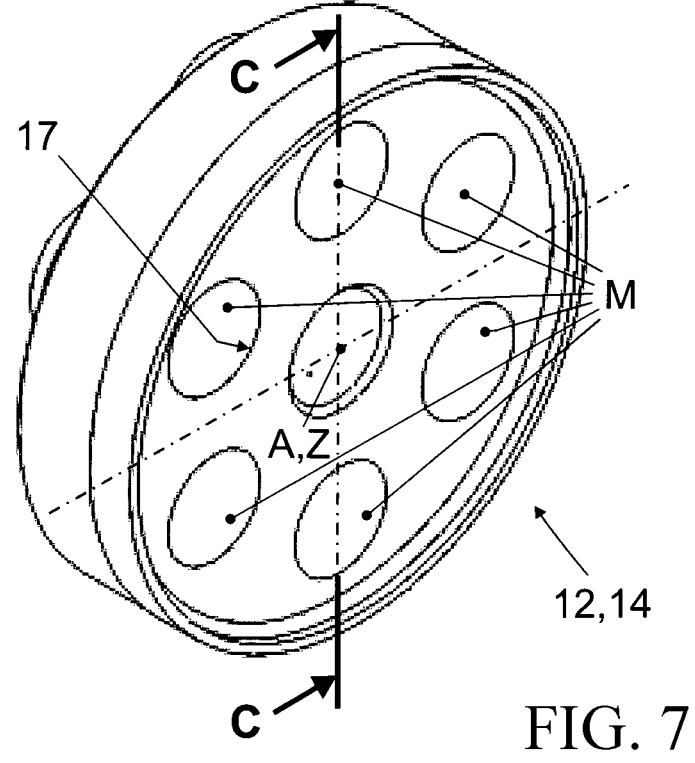
FIG. 7

METHOD FOR PRODUCING WELDED CONNECTIONS AND AN AUXILIARY DEVICE

TECHNICAL FIELD

The invention relates to a method for producing welded connections between inner tubes and tube support plates of a tube bundle for a product-to-product shell-and-tube heat exchanger by means of an auxiliary device, wherein the relevant tube support plate is welded by its endface that faces the inner tubes. The invention also relates to an auxiliary device for the production method, to a tube bundle welded by means of the production method or the auxiliary device, and to a product-to-product shell-and-tube heat exchanger comprising at least one tube bundle.

BACKGROUND

A wide variety of heat exchangers are used in the food and beverage industry, by means of which food products are heat-treated. The relevant selection, for example plate or tube heat exchangers in their highly diverse designs, is based on the food product to be treated. The tube heat exchanger is suitable for low-viscosity products such as milk and other dairy products, beverages, and juices as well as for medium- to high-viscosity products such as concentrates, soups, or desserts, and also for such products that additionally contain fibers and/or pulp. In general, the product flows through the so-called inner tubes for the purpose of heat treatment and a heat exchange medium, for example steam or water, flows around said inner tubes, preferably in the opposite direction, from the outside in a housing surrounding the inner tubes, preferably a shell tube.

A particularly energy-efficient design of the known tube heat exchangers is a so-called shell-and-tube heat exchanger (see FIG. 1). Said heat exchanger consists of a plurality of tube bundles (FIGS. 2A, 2B, and 3), each of which comprises multiple inner tubes connected in parallel and comprising a common inlet and a common outlet for the product. The relevant group of inner tubes or respectively a so-called set of inner tubes is surrounded by the shell tube, which is provided with a connection piece for a heat exchange medium in each case close to its ends, which connection piece opens into and out of said shell tube radially. The heat transfer medium flows through the shell tube, preferably counter to the direction of flow in the inner tubes, i.e., a product flow.

The inner tubes penetrate both sides and each end face of a plate inner bore in a so-called tube support plate (FIG. 3) and are each connected by their tube end to the tube support plate, specifically on the end face thereof facing away from the inner tubes (front face of the tube support plate), preferably by means of a circumferential round weld. Other material connections with or without an additional material are also possible instead of a welded connection. Therefore, there is a circumferential annular gap between the outside of the inner tube and the assigned plate inner bore in the tube support plate, which circumferential annular gap extends from the circumferential material connection point between the inner tube and tube support plate through the tube support plate and into an interior space for the tube bundle or respectively of the shell tube that is supplied with the heat transfer medium. Said circumferential annular gap is not problematic so long as the heat transfer medium exclusively remains a heat transfer medium such as water or steam and is not substituted by a food product.

However, if so-called product-to-product heat exchange is to take place to improve the heat transfer efficiency in a shell-and-tube heat exchanger, the above-mentioned circumferential annular gap becomes problematic because product can solidify here. Even in the best-case scenario, said product can only be cleaned off with particularly intensive and long-lasting through-flow cleaning in excessive doses, i.e., so-called clean-in-place (CIP), with the aim of rendering the circumferential annular gap microbiologically sound for the following product run.

In particular in the case of regenerative heat exchange systems in which, for example, the heat produced when cooling an end product is used to preheat a product yet to be treated, energy efficiency or respectively cost-effectiveness is known to be higher in the case of heat exchange from product to product (P-P) than in the case of heat exchange from product to heat transfer medium to product (P-HTM-P). This is because the heat transfer can be improved by means of a greater logarithmic temperature difference and by higher flow speeds of the product flows (higher Reynolds number). The heat exchange surfaces can be reduced in size as a result. Due to the higher Reynolds numbers, tube bundles with greater tube lengths can also be implemented, which reduces costs.

In the known form, from a sanitary or even aseptic point of view, shell-and-tube heat exchangers are only suitable for product-to-product heat exchange at the cost of cleaning in excessive doses. Therefore, it has been proposed (see Patent Publication No. JP 2020-117121 A) to create an additional circular weld on the rear face of the tube support plate, i.e., on the end face of the tube support place facing the inner tubes, to close off the problematic annular gap against the ingress of product. A disadvantage of a respective circumferential round weld on the front face and additionally on the rear face of the tube support plate is that an enclosed annular space or respectively annular gap is formed between the two circular welds or, alternatively, between the two material connections of another type, which poses a risk to food safety if the circular welds or respectively material connections are not flawless and pore-free. This is very difficult or even impossible to check. This then poses the danger of microorganisms settling in the enclosed annular space, which could re-contaminate a subsequent product.

Patent Publication No. U.S. Pat. No. 2,996,600 A describes a welded connection between a tube and a tube support plate in the context of a tube heat exchanger. The tube has an inner diameter that corresponds to the diameter of a bore assigned to the tube in the tube support plate. The tube and tube support plate are welded to one another in such a way that the inner diameter of the tube and the diameter of the bore are aligned with one another. The orientation and centering of the tube on the tube support plate required for this is achieved by means of a recess on the tube support plate in which the tube engages. A reversal of this principle is also disclosed, wherein a recess is provided on the tube end to be connected and outwardly encloses a neck surrounding the bore in the tube support plate. The relevant form-fit region between the tube and the tube support plate is welded by means of an orbitally revolving welding tool, starting from the inside of the inner diameter of the tube and of the bore of the tube support plate, in a single pass and continuously from radially inside to radially outside.

Patent Publication No. WO 2014/060425 A1 (or respectively US 2015/0267973 A1) proposes various ways in which the connection in question between an inner tube and a tube support plate of a tube bundle of a shell-and-tube heat exchanger can be made while preventing a circumferential annular gap between the outside of the inner tube and the bore in the tube support plate.

Patent Publication No. DE 15 01 463 A discloses a device for horizontally assembling heat exchangers. A tube bundle held together by means of holders, the tubes of which tube bundle open by their tube ends into assigned bores of a tube sheet, is inserted into a shell of the heat exchanger, which shell is open on both sides. The holders obviously remain on and in the tube bundle, even after assembly and during operation of the heat exchanger.

Features for embedding the tubes of the tube bundle in the tube sheet and for connecting said tubes to said tube sheet (for example welded connections) are not disclosed. It can be assumed that the individual tubes of the tube bundle are pushed through assigned bores in the tube sheet and materially connected, presumably welded, by the open tube ends to the end face of the tube sheet facing away from the tubes. As already mentioned above, welded connections of this type result in a problematic annular gap between the outer diameter of the relevant tube and the inner diameter of the receiving bore in the tube sheet.

The above-mentioned features in combination with one another, in the context of the design of a welded connection between the inner tube and tube support plate (see Patent Publication No. U.S. Pat. No. 2,996,600 A) and in the context of a holder or respectively auxiliary device by means of which the tubes of a tube bundle can be held together (see Patent Publication No. DE 15 01 463 A), form the generic basis for the subject matter of the present invention.

SUMMARY

Proceeding from the above-mentioned prior art, an object of the present invention is to provide a production method that, by means of an auxiliary device, ensures a welded connection between the inner tubes and the tube support plate of a tube bundle for a product-to-product shell-and-tube heat exchanger that is safe from a hygienic and sanitary point of view, that is dimensionally accurate, and that is of a high, reproducible quality. Furthermore, an aim of the invention is to specify an auxiliary device for carrying out the production method according to the invention.

A production method described herein proceeds from a method for producing welded connections between inner tubes and tube support plates of a tube bundle for a product-to-product shell-and-tube heat exchanger by means of an auxiliary device, wherein the relevant tube support plate is welded by its end face that faces the inner tubes. The method includes steps (i) to (iii) as follows.

(i) Orienting the inner tubes with assigned plate inner bores arranged in the tube support plate in such a way that the inner tubes and the plate inner bores are aligned with one another, i.e., their axes of rotation extend coaxially.

(ii) Fixing the relevant inner tube and the tube support plate to one another in an unwelded starting position by means of a form fit that is effective radially and in opposing directions, wherein more than one plate inner bore is defined and therefore a tube layout pattern is established by means of the tube support plate for assigned inner tubes arranged in parallel with one another. The radial fixing acts in both directions, and the axial fixing is restricted to the inner tube abutting the tube support plate in one direction and is detachable therefrom in the opposite direction.

(iii) Immovably fixing a number n of inner tubes required in each case to one another as a whole according to the tube layout pattern and in the relevant form fit with the tube support plate by means of the auxiliary device. The tube support plate establishes a tube layout pattern for the arrangement of assigned inner tubes arranged in parallel with one another by defining more than one inner bore. The number n of possible inner bores is two or more, wherein an arrangement with n=7 inner tubes is preferred, of which one is arranged centrally in the tube support plate and the others are evenly distributed around a single pitch circle that extends concentrically with the center of the tube support plate. The auxiliary device serves to immovably fix the inner tubes to one another.

In the case of a production method according to the invention, an inventive underlying concept consists in providing a solution to the problem not only for a single inner tube, as disclosed in the prior art, but for a group or respectively a set of inner tubes extending in parallel with one another in a continuous welding process that covers all inner tubes of the set one after the other.

To this end, the production method includes additional steps (iv) to (viii) as follows.

(iv) Pressing the end face of the tube support plate against the end face of the inner tubes in the direction of the inner tube longitudinal axes of the inner tubes for the duration of the welding operations for all the inner tubes with a first form fit, which is effective both radially and axially and in each case in opposing directions, wherein the plate inner bore and a tube inner bore of the inner tube have inner diameters of equal size. Because of the pressing, the undesired formation of gaps between the end faces of the inner tubes and the tube support plate, which can be caused by means of thermal input during welding, is prevented or respectively minimized.

(v) Immovably fixing the number n of inner tubes required in each case to one another as a whole according to the tube layout pattern by means of a second, detachable form fit of the auxiliary device. The second form fit preferably dispenses with a force-fitting component, wherein this embodiment also includes an optionally present central inner tube.

(vi) Making a circumferential round weld orbitally, starting from the plate inner bore and the tube inner bore, in a single pass and continuously from radially inside to radially outside, wherein at least one axial form fit depth of the first form fit is covered by a weld width of the circumferential round weld. The welding preferably takes place without additional material and under an inert gas atmosphere that is suitable for the materials to be connected. The axial form fit depth is matched to a weld width that results under the given welding and wall thickness conditions. The axial form fit depth may not exceed a possible weld width. A circumferential round weld should be understood to mean a weld that is self-enclosed, i.e., without local interruptions.

(vii) Welding the inner tubes to the tube support plate one after the other. All welded connections are made once the inner tubes have assumed the arrangement position immovably established by means of the auxiliary device.

(viii) Detaching and removing the auxiliary device from the welded tube arrangement.

To minimize material stresses in the course of the welding process, which endures over all welded connections, a welding sequence is provided such that, if present, initially an inner tube arranged centrally in the tube support plate and subsequently the external inner tubes arranged on a pitch circle around the central inner tube are welded to the tube support plate, in each case in the opposite order.

An auxiliary device for a method for producing welded connections between inner tubes and tube support plates of a tube bundle for a product-to-product shell-and-tube heat exchanger is also described herein where a welded connection is designed as follows:

The inner tube, with its tube inner bore, is connected to an end face of the disk-shaped tube support plate that faces the inner tubes in a plane perpendicular to an inner tube longitudinal axis, which tube support plate comprises a plate inner bore.

The tube inner bore and the plate inner bore have inner diameters of equal size and are oriented to be aligned with one another.

In an unwelded starting position, the inner tube and the tube support plate are fixed to one another by means of a first form fit, which is effective both radially and axially and in each case in opposing directions.

A circumferential round weld is made orbitally, starting from the tube inner bore, in a single pass and continuously from radially inside to radially outside.

A weld width of the circumferential round weld covers at least one axial form fit depth of the first form fit.

To produce a welded connection, an auxiliary device according to the invention for a production method according to the invention has the following features.

Within the scope of the auxiliary device, a first and a second holding ring half are provided, which form a closed ring.

The holding ring halves touch in a parting plane that extends through a center of the auxiliary device, and the holding ring halves form a non-displaceable second form fit in the parting plane.

The tube support plate establishes a tube layout pattern for the arrangement of inner tubes arranged in parallel with one another by defining more than one inner bore provided in it.

The tube layout pattern is reproduced in the holding ring halves in such a way that inner tubes arranged to be evenly distributed around a single pitch circle are in each case enclosed at most by one half by the holding ring halves, wherein the opening of the relevant enclosing contour faces the center of the holding ring halves. These conditions are met by corresponding dimensioning of an inner diameter of the holding ring halves that are closed to form a ring, wherein the dimensioning depends on the number of inner tubes located on the pitch circle.

The parting plane additionally extends through at least one inner tube longitudinal axis lying on the pitch circle. This ensures that the holding ring halves enclose all inner tubes and can fix same as a whole and that it is possible to detach and remove the holding ring halves from the welded tube arrangement once all inner tubes have been welded to the tube support plate.

Holding means are provided, which engage displaceably in the holding ring halves in each case on the periphery of the holding ring halves and in a star shape oriented towards the center.

The lateral surfaces of the holding means are in each case tangent on both sides to adjacent inner tubes arranged on the pitch circle.

If necessary, the holding means fix an inner tube arranged in the center by means of their relevant end face facing the center and are in each case detachably fixed in this position themselves.

An auxiliary device according to the invention designed according to the above-mentioned features is suitable for receiving within it tube arrangements comprising at least two inner tubes as intended.

It is sufficient if the second form fit fixes the first and the second holding ring half to one another in the radial direction. The holding ring halves are expediently fixed to one another in the axial direction, as is provided, in that the first and the second holding ring half are detachably interconnected by means of a connection means. For example, connection screws may be arranged on the periphery of the first and the second holding ring half so as to be diametrically opposite one another.

If the auxiliary device is in the closed position and fixes a required number of inner tubes in this position such that said inner tubes can be welded to the assigned tube support plate according to a production method according to the invention, the holding means that fix the inner tubes in the second form fit are themselves then immovably fixed in the assigned holding ring half in each case by means of a securing means, for example a securing screw.

A particularly advantageous tube layout pattern is characterized in that seven inner tubes are provided, wherein one inner tube is located coaxially in the center of the auxiliary device and six inner tubes are arranged to be evenly distributed around the pitch circle. The parting plane additionally extends through two diametrically opposed inner tubes. In this arrangement, the inner tube longitudinal axes of three adjacent inner tubes in each case form the corners of an equilateral triangle, a result of which is that the radial distance between all adjacent inner tubes in each case is equal because all inner tubes generally have an equal outer diameter. Under these boundary conditions, the heat transfer and heat transmission conditions are approximately the same for all inner tubes, not taking into account the special flow conditions of the central inner tube with respect to the other inner tubes located on the pitch circle.

A shift of the circumferential round weld partially or fully into the tube support plate results in a discontinuous progression of the connection cross-sections from a relatively small connection cross-section of the inner tube to the solid cross-section of the tube support plate. A progression of this kind is unfavorable in terms of strength.

By means of a production method according to the invention and an auxiliary device according to the invention for welded connections between inner tubes and tube support plates, it is possible to produce a tube bundle consisting of a plurality of inner tubes for a product-to-product shell-and-tube heat exchanger according to the problem addressed by the invention, and the above-mentioned unfavorable cross-sectional progression can be avoided. Specifically, the welded connection is designed as a circumferential round weld, and the tube support plate, radially spaced apart on the outside of the circumferential round weld, comprises a circumferential, axially extending plate cut-out in the shape of an annular gap and designed such that the wall thickness of the tube support plate to be welded to the circumferential round weld assumes a value that is between one and two tube wall thicknesses.

The present invention allows for a method for producing welded connections between inner tubes and tube support plates to be carried out using an auxiliary device according to the invention in its proposed embodiments.

A production method according to the invention and an auxiliary device according to the invention are based on a welded connection according to the invention between inner tubes and tube support plates of a tube bundle for a product-to-product shell-and-tube heat exchanger. Said welded connection ensures that the above-mentioned circumferential annular gap that is problematic from a hygienic and sanitary point of view is prevented between the outer diameter of the inner tube and the inner diameter of the assigned plate inner bore.

An additional aim of the present invention is to optimize the tube produced by means of the welded connection according to the invention within the scope of an additional design. An embodiment is characterized in that:

the inner tube, with its tube inner bore, is connected to an end face of the disk-shaped tube support plate that faces the inner tubes in a plane perpendicular to an inner tube longitudinal axis, which tube support plate comprises a plate inner bore, the tube inner bore and the plate inner bore have inner diameters of equal size and are oriented to be aligned with one another, in an unwelded starting position, the inner tube and the tube support plate are fixed to one another by means of a first form fit, which is effective both radially and axially and in each case in opposing directions, a circumferential round weld is made orbitally, starting from the plate inner bore and the tube inner bore, in a single pass and continuously from radially inside to radially outside, a weld width of the circumferential round weld covers at least one axial form fit depth of the first form fit, and the circumferential round weld is positioned such that the weld width engages in the tube support plate at most by the form fit depth, when viewed from the side of the inner tube.

If the circumferential round weld is positioned such that the weld width engages in the tube support plate at most by the form fit depth, when viewed from the side of the inner tube, the tube support plate must merely be countersunk or respectively drilled out to the outer diameter of the inner tube and at most to the form fit depth. This quantitative design ensures that there is no longer a gap between the outer dimeter of the inner tube and the inner bore in the tube support plate that is not spanned by the circumferential round weld. Countersinking to less than the form fit depth shifts some of the width of the circumferential round weld into a tube region arranged upstream of the tube support plate.

Another proposal also remedies the unfavorable cross-sectional progression and in particular improves the strength properties under changing mechanical and/or thermal loads. Said proposal provides for the circumferential round weld, relative to the tube support plate, to be positioned by an upstream axial form fit distance of the first form fit from the tube support plate, wherein a neck is formed in the tube support plate in this region to a wall thickness between one and two tube wall thicknesses.

Furthermore, the present invention allows for the production of a product-to-product shell-and-tube heat exchanger comprising at least one tube bundle that is welded in each case according to one of its proposed embodiments.

BRIEF DESCRIPTION OF THE DRAWINGS

A more detailed portrayal of the invention can be found in the following description and the accompanying figures of the drawing as well as in the claims. The invention can be implemented in the wide variety of embodiments of a production method comprising steps described herein. Furthermore, the invention is achieved in the wide variety of embodiments of an auxiliary device according to the invention for a production method according to the invention. A tube bundle for a product-to-product shell-and-tube heat exchanger, welded using a method (e.g., performing the welding operations) for producing welded connections between inner tubes and tube support plates by means of the auxiliary device, and a product-to-product heat exchanger comprising at least one tube bundle, also form part of the subject matter of the invention. In the following, the production method, the auxiliary device, the tube bundle, and the product-to-product heat exchanger are described based on example embodiments with reference to the drawing. The method includes detaching and removing the auxiliary device from the tube bundle after the welding operations are completed.

FIG. 4 is a meridian section through a first welded connection between an inner tube and a tube support plate in conjunction with a welding tool according to the prior art.

FIG. 4A is an enlarged representation of a second embodiment according to the prior art that is an alternative embodiment to the embodiment of the first welded connection according to FIG. 4.

FIG. 4B is an enlarged representation of a third embodiment according to the prior art that is an alternative embodiment to the embodiment of the first welded connection according to FIG. 4.

FIG. 7 is a perspective representation of a tube support plate for seven inner tubes according to an embodiment of the invention.

FIG. 7A is a perspective representation in meridian section of the tube support plate along a section line denoted by "C-C" in FIG. 7.

FIG. 7B is a view in meridian section of the tube support plate according to FIG. 7A.

DETAILED DESCRIPTION

Figures 1, 2A, 2B:
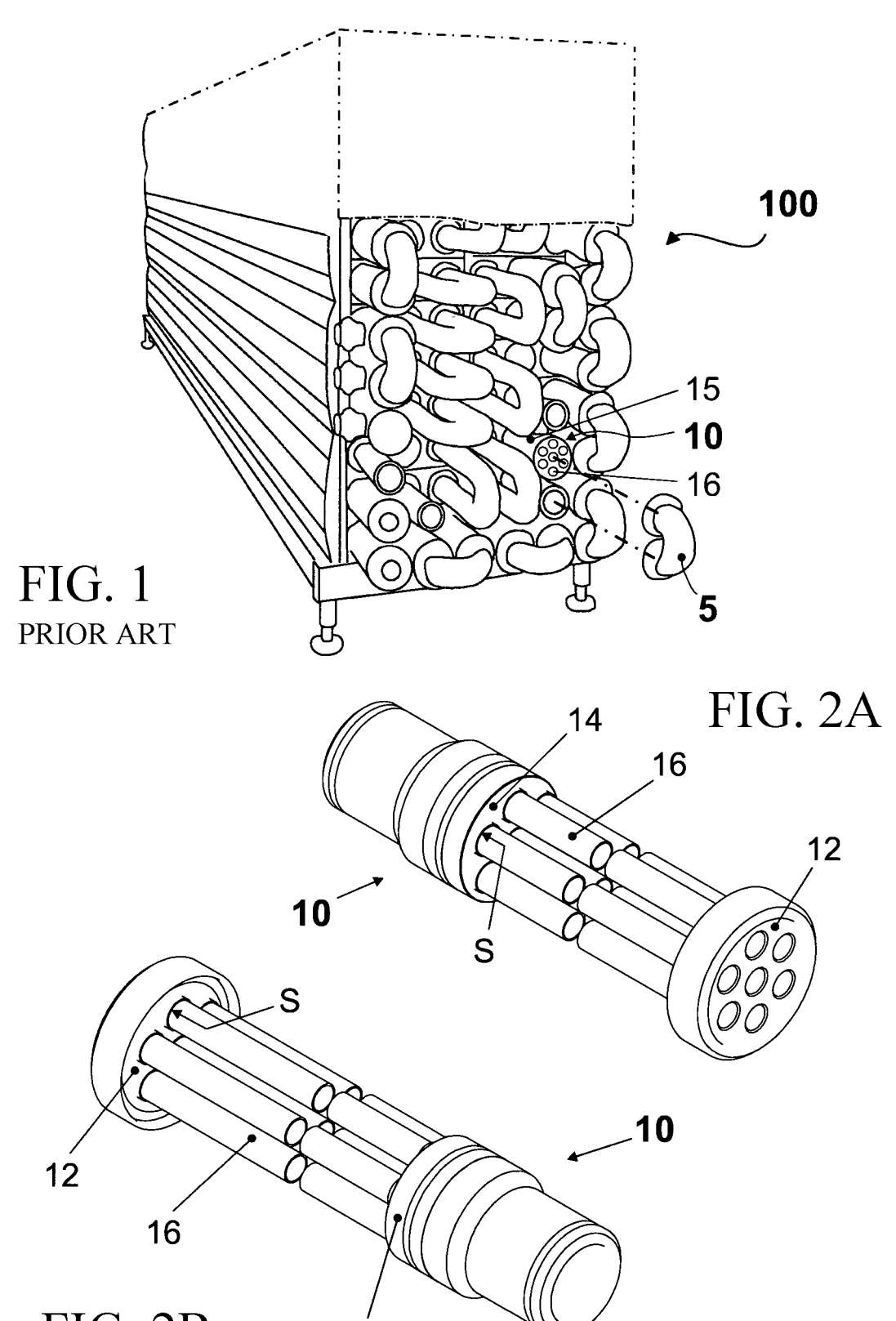
FIG. 1 is a schematic and perspective representation of a shell-and-tube heat exchanger according to the prior art.
FIG. 2A is a perspective representation of a tube bundle according to the prior art comprising a number of inner tubes and in a view onto an end face (front face) of the tube support plate facing away from the inner tubes and an end face (rear face) of the tube support plate facing the inner tubes
FIG. 2B is a perspective representation of the tube bundle according to FIG. 2A from the opposite viewing direction to FIG. 2A.
Figure 3:
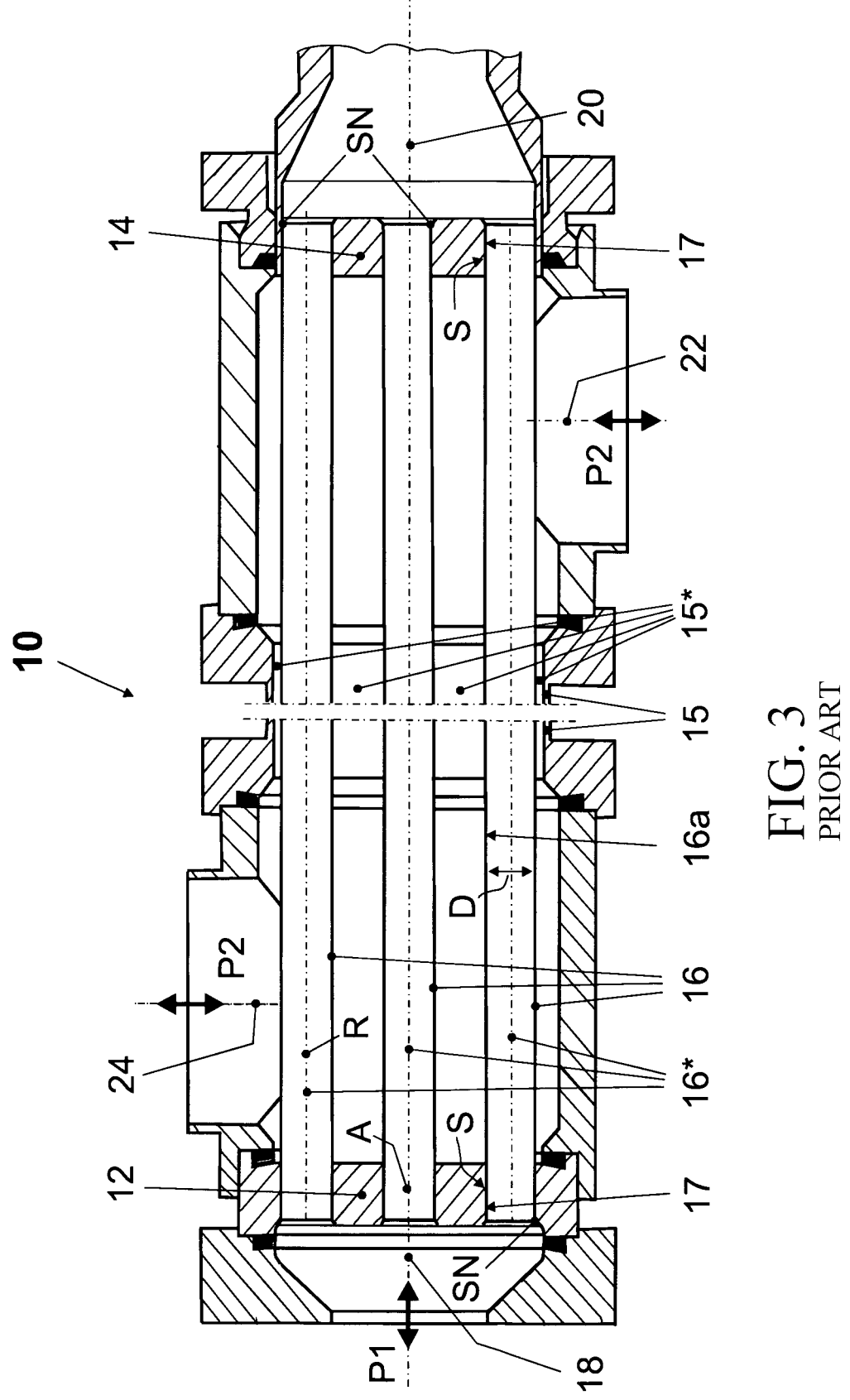
FIG. 3 is a meridian section through a tube bundle according to FIGS. 2A and 2B, integrated in a housing for supplying and evacuating a heat transfer medium.

FIG. 1 shows an exemplary embodiment of a shell-and-tube heat exchanger 100 according to the prior art, in which, in general, a plurality of tube bundles 10 having connecting bends 5 are fluidically connected in series. The tube bundle 10 according to the prior art consists of a set of multiple inner tubes 16 (see FIGS. 2A and 2B) that extend in parallel with one another and are also fluidically connected in parallel, that each penetrate a relevant plate inner bore 17 in a first and a second tube support plate 12, 14 at their ends (FIG. 3), that are supported on said plate and that are welded to the tube support plate 12, 14 circumferentially on their tube outer diameter of the tube ends on the end face (front face) of said plate that faces the inner tubes 16. Each set of inner tubes 16 is arranged in an outer tube or respectively shell tube 15 (FIGS. 1 and 3). A product, for example a food product, is conveyed through the inner tubes 16, and a so-called heat transfer medium, for example water or steam, flows around the outside of the inner tubes 16 inside the outer tube 15. FIGS. 2A and 2B each also show an annular gap S that is formed between an outer diameter of each inner tube 16 and the respectively assigned plate inner bore 17 within the tube support plate 12, 14 (FIG. 3).

The tube bundle 10 known from the prior art (FIG. 3—only the components that are relevant here have been marked; see also Patent Publication No. DE 94 03 913 U1) consists, in its central portion, which is shown with an interruption, of the outer tube 15 (or respectively outer shell) that delimits an outer channel 15\* and that comprises, based on the position in the representation, an outer tube flange (not marked) arranged on the left-hand side at the fixed bearing and an outer shell flange (not marked) arranged on the right-hand side at the floating bearing. The outer shell flange at the floating bearing adjoins a first housing comprising a second inlet 22 and the outer shell flange at the fixed bearing adjoins a second housing comprising a second outlet 24. A number n of inner tubes 16 that extend axially parallel to the outer tube 15 through the outer channel 15\* together form an inner channel 16\* supported at the ends in each case in the left-hand tube support plate 12, which is part of a fixed bearing, and the right-hand tube support plate 14, which is part of a floating bearing. The inner channel 16\* is welded to the end face of the respectively assigned tube support plate 12, 14 that faces the inner tubes 16 on their tube outer diameter via a circumferential weld SN.

This overall arrangement is inserted into the outer tube 15 via an opening (not otherwise identified) in the second housing and is clamped together with the second housing via a fixed-bearing exchanger flange that accommodates a first inlet 18, with the interposition of a seal in each case. The inner tube 16, the inner tube longitudinal axis of which is denoted by R, comprises a tube inner bore 16a with an inner diameter D. The tube support plates 12, 14 at the fixed bearing and at the floating bearing each have a plate axis of rotation A that are arranged coaxially with one another and that, in turn, extend coaxially with the inner tube longitudinal axis R of a central inner tube 16, if present. The tube support plate 14 at the floating bearing is connected to a floating-bearing connection piece that accommodates a first outlet 20.

Depending on the arrangement of the relevant tube bundle 10 in the shell-and-tube heat exchanger 100 and its circuitry, based on the position in the representation, a first product P1 to be heat-treated can flow through the inner tubes 16 via the first inlet 18 either from the left to the right to the first outlet 20 or vice versa. In the case of the respectively adjacent tube bundle 10, which is connected in series with the above-described tube bundle 10 in each case via the connecting bend 5, these inlet and outlet relationships are reversed accordingly.

The outer channel 15\* may be supplied with a heat transfer medium such as water or steam. In the case of so-called product-to-product heat exchange, the heat transfer medium is a second product P2. The flow through the outer channel 15\* may take place from the second inlet 22 to the second outlet 24 or vice versa. Heat exchange then takes place in a flow in the same or in the opposite direction depending on the orientation of the flow guidance in the inner tubes 16 and in the inner channel 15\*.

In the case of product-to-product heat exchange, the annular gap S already mentioned above in connection with FIGS. 2a and 2b is problematic with regard to cleaning, because the second product P2, which can penetrate here during the product run, can only be cleaned off completely by means of CIP in excessive doses or, in particularly difficult conditions, cannot be cleaned off in this way to a sufficient extent before the next product run.

Welded Connections

The annular gap S disclosed in FIGS. 2A, 2B, and 3 is eliminated if the welded connection between the inner tube 16 and the tube support plate 12, 14 is designed as shown based on a first welded connection in FIG. 4 and as is known. The first welded connection is characterized in that the inner tube 16, with its tube inner bore 16a, is connected to an end face of the disk-shaped tube support plate 12, 14 that faces the inner tube 16 in a plane perpendicular to an inner tube longitudinal axis R, which tube support plate comprises a plate inner bore 17. The tube inner bore 16a and the plate inner bore 17 preferably have inner diameters D of equal size and are oriented to be aligned with one another. A circumferential round weld 36, in relation to the tube support plate 12, 14, is positioned at a distance from the tube support plate 12, 14 by an upstream axial form fit distance B2 of a first form fit F1, wherein a neck is formed in the tube support plate 12, 14 in this region to a tube wall thickness d.

In an unwelded starting position, the inner tube 16 and the tube support plate 12, 14 are fixed to one another by means of the first form fit F1, which is effective both radially and axially and in each case in opposing directions. For this purpose, the tubular neck of the tube support plate 12, 14 comprises a plate inner recess 26 that is oriented coaxially with the inner tube longitudinal axis R, that has an axial form fit depth B1 in the axial direction, and that engages coaxially around the outside of a tube outer recess 32 that has the same form fit depth B1.

A welding tool 40 is inserted into the plate inner bore 17 up to the planned location of the weld 36 in the direction of the inner tube longitudinal axis R. The welding tool 40 makes the circumferential round weld 36 with an orbital movement U by means of a welding electrode 42 that is oriented perpendicularly to the plate and tube inner bore 17, 16a, and preferably makes said weld in a single pass and continuously from radially inside to radially outside. The weld width b of the circumferential round weld 36 is designed such that the weld width b at least covers the axial form fit depth B1 of the first form fit F1.

During the individual welding operation and throughout the entire welding sequence of all welding operations for a set of inner tubes 16 to be welded to the assigned tube support plate 12, 14, the inner tubes 16 and the tube support plate 12, 14 are pressed against one another by means of a pressing force PR.

The inner tube 16 used with the inner diameter D, the tube wall thickness d, and an inner tube length L is generally a slim, thin-walled inner tube 16 that is to be welded to the generally solid tube support plate 12, 14, which has a plate wall thickness B. The specific respective quantitative dimensions depend on the size of the tube bundle 10 and on the heat transfer capacity thereof and can therefore only be given approximately in a general consideration by the following dimension ratios:

$$D/d>10; \ L/D>100 \text{ and } B/d>10.$$

FIG. 4A shows a second welded connection according to the prior art that is between the inner tube 16 with the inner bore 16a and the tube support plate 12, 14 with the plate inner bore 17 of equal diameter. In an unwelded starting position, the inner tube 16 with the tube wall thickness d and the tube support plate 12, 14 are fixed to one another by means of the first form fit F1, which is effective both radially and axially and in each case in opposing directions. For this purpose, the tubular neck of the tube support plate 12, 14, with its upstream axial form fit distance B2, comprises a plate outer recess 28 that is oriented coaxially with the inner tube longitudinal axis R, that has a recess wall thickness a, that has the axial form fit depth B1 in the axial direction, and that engages coaxially inside a tube inner recess 30 that has the same form fit depth B1.

A third welded connection according to the prior art that is between the inner tube 16 with the tube inner bore 16a and the tube support plate 12, 14 with the plate inner bore 17 of equal diameter is represented in FIG. 4B. Here, in order to produce the first form fit F1, the plate inner recess 26, which engages coaxially around the outside of the full tube wall thickness d with the axial form fit depth B1, is only located in the neck of the tube support plate 12, 14. The radial dimension of the wall thickness of the neck, which extends over the upstream axial form fit distance B2, exceeds the tube wall thickness d by the recess wall thickness a.

The first to third welded connections of FIGS. 4, 4A, and 4B are each also characterized in that the circumferential round weld 36, in relation to the tube support plate 12, 14, is positioned at a distance from the tube support plate 12, 14 by the upstream axial form fit distance of the first form fit F1. A neck is formed in the tube support plate 12, 14 in this region to a wall thickness of between one and two tube wall thicknesses d.

In a fourth welded connection according to an embodiment of the invention (FIG. 5) and in a fifth welded connection according to the prior art (FIG. 6), the inner tube 16, the tube inner bore 16a of which has the same inner diameter D as the plate inner bore 17 in the tube support plate 12, 14, engages with the full tube wall thickness d and with the axial form fit depth B1 directly into the end surface of the tube support plate 12, 14 in order to produce the first form fit F1.

Figure 6:
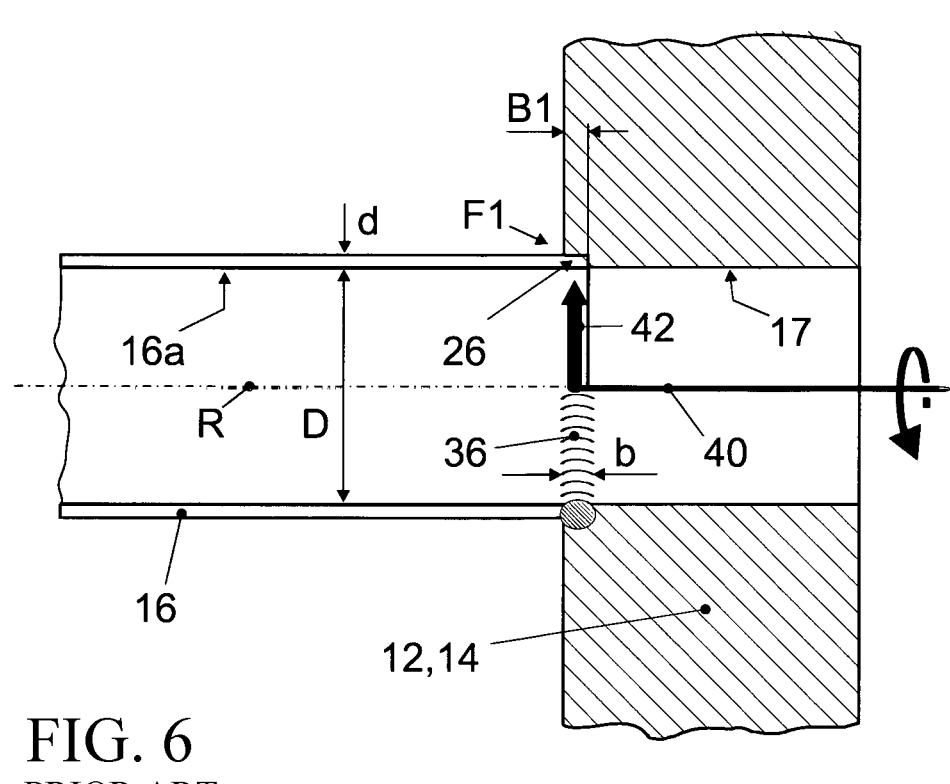
FIG. 6 is meridian section through a fifth embodiment according to the prior art that is an alternative embodiment to the embodiment of the first welded connection according to FIG. 4.

In the embodiment according to FIG. 6, the axial form fit depth B1 of the plate inner recess 26 is at most, and specifically dimensioned such that the required weld width b completely covers the axial form fit depth B1 and thus completely engages in the tube support plate 12, 13, when viewed from the side of the inner tube 16. This situation arises in that the circumferential round weld 36 is positioned such that the weld width b engages in the tube support plate 12, 14 at most by the axial form fit depth, when viewed from the side of the inner tube 16.

Figure 5:
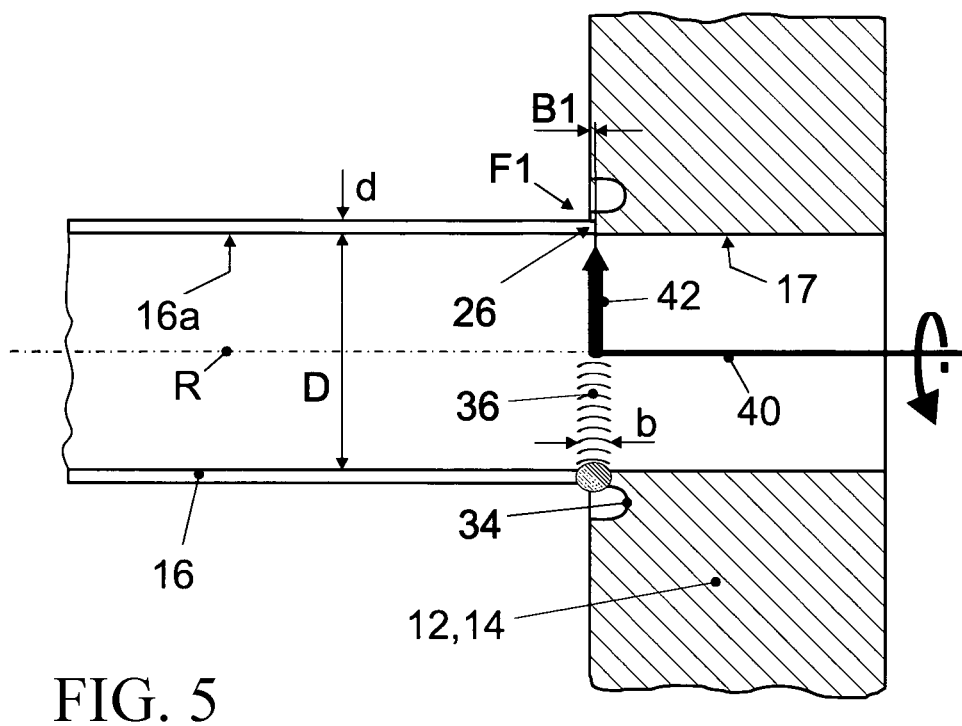
FIG. 5 is a meridian section through a first welded connection between an inner tube and a tube support plate in conjunction with a welding tool according to an embodiment of the invention, also referred to as a fourth embodiment herein.

In the embodiment of the invention according to FIG. 5, the axial form fit depth B1 of the plate inner recess 26 is dimensioned such that only part of the required weld width b of the circumferential round weld 36 is within the tube support plate 12, 14 and the remainder covers a portion of the externally exposed inner tube 16.

In order to prevent a discontinuous, and in the present case abruptly changing cross-sectional progression of the wall thicknesses to be welded, the fourth welded connection according to the embodiment of the invention of FIG. 5 is further modified with respect to the fifth welded connection according to the prior art of FIG. 6 in that the tube support plate 12, 14, radially spaced apart on the outside of the circumferential round weld 36, comprises a circumferential, axially extending plate cut-out 34 in the shape of an annular gap. In terms of its radial distance from the weld 36 and its radial width, said cut-out is designed such that the wall thickness of the tube support plate 12, 14 to be welded with the circumferential round weld 36 assumes a value that is between one and two tube wall thicknesses d (see also FIGS. 7A and 7B).

Method

The first to fifth embodiments of the welded connections described in FIGS. 4, 4A, 4B, 5, and 6 are implemented according to the object with a production method according to the invention by means of an auxiliary device 50 (FIGS. 8, 9, and 10) according to the invention. The production method proceeds from the fact that the tube support plate 12, 14 establishes a tube layout pattern M (FIG. 7) for the arrangement of assigned inner tubes 16 arranged in parallel with one another by defining more than one inner bore 17. The relevant plate axis of rotation A of the tube support plate 12, 14 does not necessarily have to be occupied by an inner tube 16. The limiting constraint for a number n of inner tubes 16 is given when a single possible pitch circle T (FIG. 10; a multiple pitch circle arrangement is not possible with the proposed auxiliary device 50) can no longer accommodate the inner tubes 16 to be arranged thereon under the required heat transfer conditions (required distances between the inner tubes 16).

Figures 8, 9:
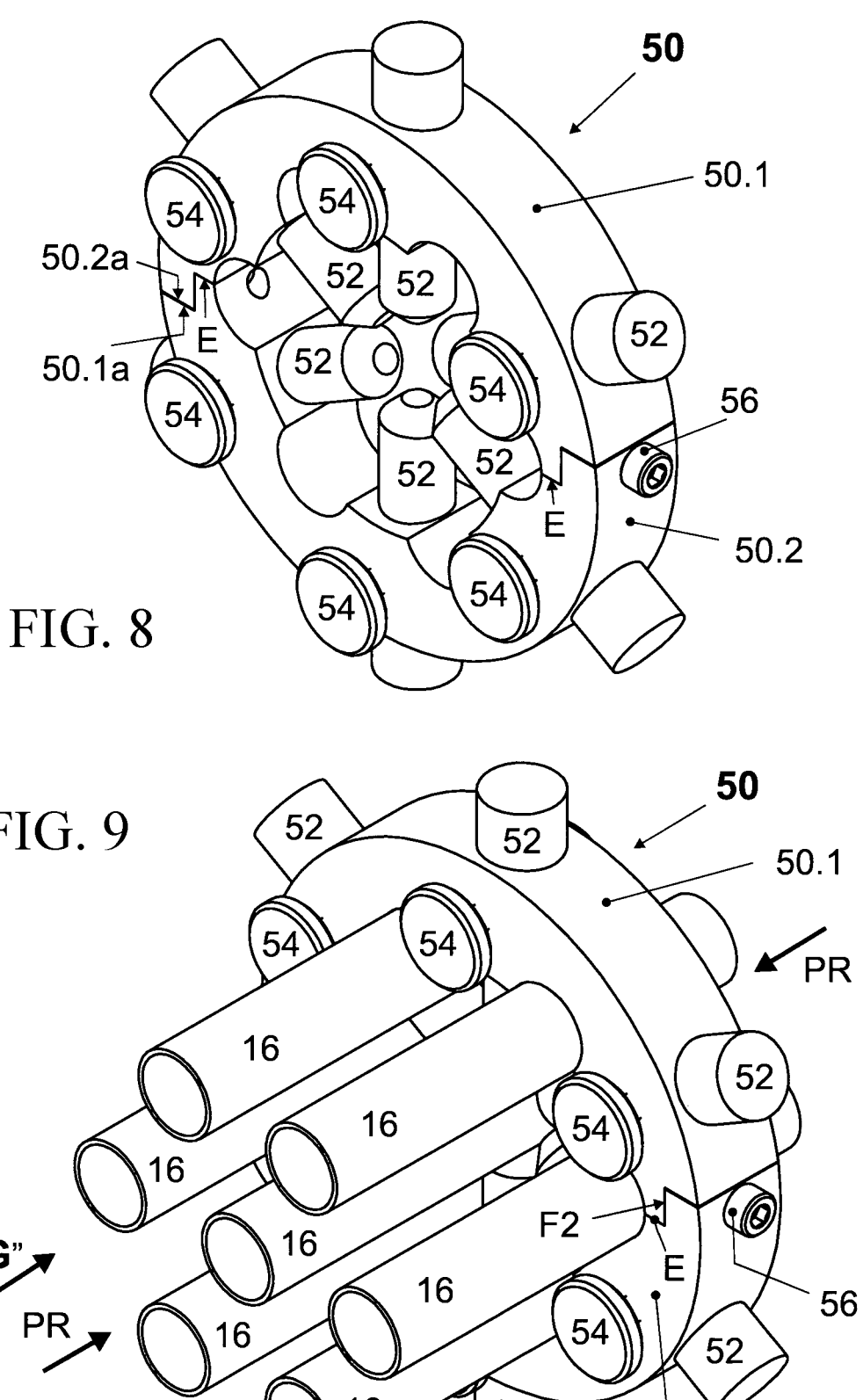
FIG. 8 is a perspective representation in an overall view of a closed auxiliary device without inner tubes according to an embodiment of the invention.
FIG. 9 is a perspective representation in an overall view of the closed auxiliary device according to FIG. 8 with inner tubes fixed therein.
Figure 10:
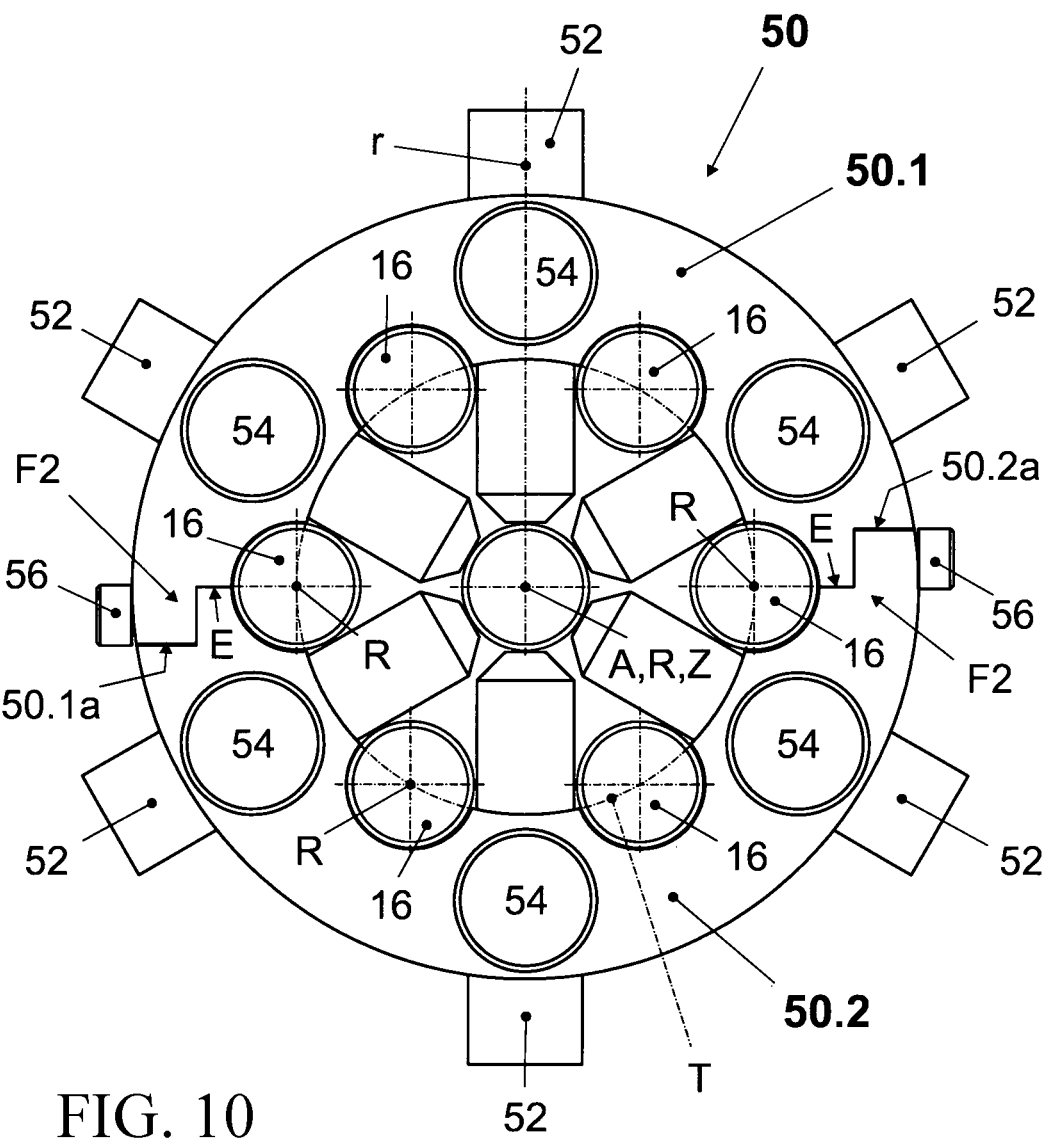
FIG. 10 is a view of the closed auxiliary device according to FIG. 9 in a viewing direction denoted by "G" in FIG. 9.

The auxiliary device 50 immovably fixes the respectively required number n of inner tubes 16 to one another as a whole according to the tube layout pattern M and in the relevant first form fit F1 with the tube support plate 12, 14 by means of a second form fit F2 (FIGS. 9 and 10). Throughout the duration of the welding operations for all inner tubes 16, the tube support plate 12, 14 is pressed against the inner tubes 16 by means of the pressing force PR in the direction of the inner tube longitudinal axes R (FIG. 9; tube support plate 12, 14 is not shown), and the inner tubes 16 are welded one after the other to the tube support plate 12, 14.

In this regard, an advantageous welding sequence provides that, if present, initially the central inner tube 16 and subsequently the external inner tubes 16 arranged on the pitch circle T around the central inner tube 16 are welded to the tube support plate 12, 14, in each case in the opposite order.

Auxiliary Device

The auxiliary device 50 (FIGS. 8, 9, and 10) according to the invention allows for a welded connection that is designed as follows.

The inner tube 16, with its tube inner bore 16a, is connected to an end face of the disk-shaped tube support plate 12, 14 that faces the inner tubes 16 in a plane perpendicular to an inner tube longitudinal axis R, which tube support plate comprises a plate inner bore 17.

The tube inner bore 16*a* and the plate inner bore 17 have inner diameters D of equal size and are oriented to be aligned with one another.

In an unwelded starting position, the inner tube 16 and the tube support plate 12, 14 are fixed to one another by means of a first form fit F1, which is effective both radially and axially and in each case in opposing directions.

The circumferential round weld 36 is made orbitally, starting from the plate and tube inner bore 17, 16*a*, in a single pass and continuously from radially inside to radially outside.

The weld width b of the circumferential round weld 36 covers at least the axial form fit depth B1 of the first form fit F1.

The auxiliary device 50 consists of a first and a second holding ring half 50.1, 50.2, which form a closed ring once they have been joined together. The holding ring halves 50.1, 50.2 touch in a parting plane E that extends through a center Z of the auxiliary device 50 and, in this parting plane E, the holding ring halves 50.1, 50.2 form the non-displaceable second form fit F2 with one another via a parting plane contour 50.1*a* and a parting plane contour 50.2*a* (FIGS. 8 and 10).

Preferably, the second form fit F2 fixes the first and the second holding ring half 50.1, 50.2 to one another in the radial direction. The first and the second holding ring half 50.1, 50.2 are also advantageously interconnected detachably by means of a connection means 56 arranged on the periphery of the first and the second half ring half 50.1, 50.2, for example a connection screw, which are arranged to be diametrically opposite one another. As a result, the radially oriented second form fit F2 is additionally secured, and an axial displacement of the holding ring halves 50.1, 50.2 relative to one another is prevented.

The tube support plate 12, 14 establishes the tube layout pattern M for the arrangement of inner tubes 16 arranged in parallel with one another by defining more than one plate inner bore 17 provided in it (FIGS. 7, 7*a* and 7*b*). The tube layout pattern M is reproduced in the holding ring halves 50.1, 50.2 in such a way that inner tubes 16 preferably arranged to be evenly distributed around the single pitch circle T are in each case enclosed at most by one half by the holding ring halves 50.1, 50.2 (FIG. 10), wherein the opening of the relevant enclosing contour faces the center Z of the auxiliary device 50. The parting plane E additionally extends through at least one inner tube longitudinal axis R of an inner tube 16 that lies on the pitch circle T. Holding means 52 are provided, for example preferably cylindrical holding bolts, which engage in the holding ring halves 50.1, 50.2 so as to be displaceable in the direction of a holding ring longitudinal axis r in each case on the periphery of the holding ring halves 50.1, 50.2 and with the holding means longitudinal axis r in a star shape oriented towards the center Z.

The lateral surfaces of the holding means 52 are in each case tangent on both sides to adjacent inner tubes 16 arranged on the pitch circle T. Furthermore, if necessary, the holding means 52 fix an inner tube 16 arranged in the center Z by means of their relevant end face facing the center Z and are in each case detachably fixed in this position themselves (FIG. 10). Preferably, the holding means 52 are immovably fixed in the assigned holding ring half 50.1, 50.2 in each case by means of a securing means 54, preferably by means of a set screw.

In the embodiment of a particularly advantageous tube layout according to FIGS. 7, 7A, and 7B, seven plate inner bores 17 are provided, wherein a plate inner bore 17 is coaxial with the plate axis of rotation A of the tube support plate 12, 14 and six plate inner bores 17 are arranged so as to be evenly distributed around the pitch circle T (FIGS. 8, 9, and 10). In this case, the parting plane E additionally extends through two inner tubes 16 or respectively plate inner bores 17 that are arranged to be diametrically opposed to one another (FIG. 10).

The fixing of the inner tubes 16 in the auxiliary device 50 by means of holding means 52 may also take place in another manner to that described above, for example by means of displaceable and securable molded parts that can be inserted in the axial direction from the side of the auxiliary device 50 facing away from the tube support plate 12, 14 into an annular, detachably separable auxiliary device 50 between the inner tubes 16 and immovably fix the inner tubes 16 to one another. Any design of the auxiliary device 50 that immovably fixes the set of inner tubes 16 to one another during the welding sequence by means of the second form fit F2 and adjusts the inner tubes 16 as a whole in the first form fit F1 relative to the tube support plate 12, 14 and presses said inner tubes against the tube support plate by means of a pressing force PR makes it possible to carry out a production method according to the invention for welded connections between inner tubes 16 and tube support plates 12, 14 of a tube bundle 10 for a product-to-product shell-and-tube heat exchanger 100.

Tube Bundle

The present disclosure also describes a tube bundle 10 for a product-to-product shell-and-tube heat exchanger 100 of the like known in its basic design in the prior art and of the like shown by way of example in FIG. 3 in conjunction with FIGS. 2A and 2B. In contrast to this known design, the problematic annular gap S is prevented in that the tube bundle 10 is welded in this region by means of a method for producing welded connections between inner tubes 16 and tube carrier plates 12, 14 as described herein, and/or is carried out in this region by means of a method for producing welded connections between inner tubes 16 and tube support plates 12, 14 by means of an auxiliary device 50 as described herein.

Namely, the welded connection is designed as a circumferential round weld 36 and the tube support plate 12, 14, radially spaced apart on the outside of the circumferential round weld 36, comprises a circumferential, axially extending plate cut-out 34 in the shape of an annular gap. The cut-out 34 is designed such that the wall thickness of the tube support plate 12, 14 to be welded to the circumferential round weld 36 assumes a value that is between one and two tube wall thicknesses d.

The tube bundle 10 welded using a method for producing welded connections between inner tubes 16 and tube support plates 12, 14 and by means of an auxiliary device 50 according to the teachings herein can comprise a welded connection that is designed such that:

the inner tube 16, with its tube inner bore 16*a,* is connected to an end face of the disk-shaped tube support plate 12, 14 that faces the inner tubes 16 in a plane perpendicular to an inner tube longitudinal axis R, which tube support plate comprises a plate inner bore 17, the tube inner bore 16*a* and the plate inner bore 17 have inner diameters D of equal size and are oriented so as to be aligned with one another, in an unwelded starting position, the inner tube 16 and the tube support plate 12, 14 are fixed to one another by means of a first form fit F1, which is effective both radially and axially and in each case in opposing directions, a circumferential round weld 36 is made orbitally, starting from the plate and tube inner bore 17, 16a, in a single pass and continuously from radially inside to radially outside, the weld width b of the circumferential round weld 36 covers at least the axial form fit depth B1 of the first form fit F1, and the circumferential round weld 36 is positioned such that the weld width b engages in the tube support plate 12, 14 at most by the axial form fit depth B1, when viewed from the side of the inner tube 16.

The present disclosure also describes a product-to-product shell-and-tube heat exchanger comprising at least one tube bundle 10 of the like known in its basic design in the prior art and of the like shown by way of example in FIG. 3 in conjunction with FIGS. 2A and 2B. In contrast to this known design, the problematic annular gap S is prevented in that the tube bundle 10 is welded in this region as described herein.

A list of reference numbers used in this specification and the drawing figures is below.

100 Shell-and-tube heat exchanger
5 Connecting bend
10 Tube bundle
12 First tube support plate
14 Second tube support plate
15 Outer tube (shell tube)
15* Outer channel
16 Inner tube
16a Tube inner bore
16* Inner channel
17 Plate inner bore
18 First inlet
20 First outlet
22 Second inlet
24 Second outlet
26 Plate inner recess
28 Plate outer recess
30 Tube inner recess
32 Tube outer recess
34 Plate cut-out
36 Circumferential round weld
40 Welding tool
42 Welding electrode
50 Auxiliary device
50.1 First holding ring half
50.1a Parting plane contour
50.2 Second holding ring half
50.2a Parting plane counter-contour
52 Holding means (bolt)
54 Securing means (screw)
56 Connection means (screw)
A Plate axis of rotation
B Plate wall thickness
B1 Axial form fit depth
B2 Upstream axial form fit distance
D Inner diameter
E Parting plane
F1 First form fit
F2 Second form fit
L Inner tube length
M Tube layout pattern
P1 First product
P2 Second product PR Pressing force
R Inner tube longitudinal axis
S Annular gap
SN Weld
T Pitch circle
U Orbital movement
Z Center
a Recess wall thickness
b Weld width
d Tube wall thickness
n Number (inner tubes; inner bores)
r Holding means longitudinal axis
D/d>10 Ratio of the tube inner diameter D of the inner tube 16 to the tube wall thickness d
L/D>100 Ratio of the inner tube length L to the tube inner diameter D of the inner tube 16
B/d>100 Ratio of the plate wall thickness B to the tube wall thickness d

The invention claimed is:

1. A method for producing welded connections between inner tubes and tube support plates of a tube bundle for a product-to-product shell-and-tube heat exchanger, said method comprising steps of:

orienting the inner tubes with plate inner bores arranged in the tube support plates in such a way that the inner tubes and the plate inner bores are aligned with one another and the inner tubes are arranged in parallel with one another in a tube layout pattern established by the tube support plates;

pressing respective end faces of the tube support plates against end faces of the inner tubes in a direction of longitudinal axes of the inner tubes for a duration of welding operations for all the inner tubes with a first form fit that is effective both radially and axially and in each case in opposing directions, wherein a plate inner bore of the plate inner bores and a tube inner bore of an inner tube of the inner tubes have inner diameters of equal size;

immovably fixing a number of the inner tubes required in each case to one another as a whole according to the tube layout pattern by means of a second, detachable form fit of an auxiliary device;

performing the welding operations comprising:

making a circumferential round weld orbitally, starting from a tube support plate of the tube support plates and a tube inner bore of a first inner tube of the inner tubes, in a single pass and continuously from radially inside to radially outside, wherein at least one axial form fit depth of the first form fit is covered by a weld width of the circumferential round weld; and welding the inner tubes to the tube support plates one after another; and detaching and removing the auxiliary device from the tube bundle after the welding operations are completed.

2. The method according to claim 1, wherein the welding operations comprise a welding sequence that initially a central inner tube of the inner tubes arranged centrally in the tube support plates and subsequently external inner tubes of the inner tubes arranged on a pitch circle around the central inner tube are welded to the tube support plates, in each case in an opposite order.

3. A tube bundle for a product-to-product shell-and-tube heat exchanger, welded using the method for producing welded connections between inner tubes and tube support plates according to claim 1, wherein the welded connection is designed as the circumferential round weld and the tube support plates, radially spaced apart outside of the circumferential round weld, comprises a circumferential, axially extending plate cut-out in a shape of an annular gap and designed such that a wall thickness of the tube support plates to be welded to the circumferential round weld assumes a value that is between one and two tube wall thicknesses.

4. The tube bundle according to claim 3, comprising the inner tubes and the tube support plates, wherein the welded connection is designed such that:

each inner tube, with its tube inner bore, is connected to an end face of a respective tube support plate that faces the inner tubes in a plane perpendicular to an inner tube longitudinal axis, which tube support plates comprise a plate inner bore, and wherein the tube support plates are disk-shaped, the tube inner bore and the plate inner bore have inner diameters of equal size and are oriented to be aligned with one another, in an unwelded starting position, an inner tube of the inner tubes and the tube support plates are fixed to one another by means of a first form fit, which is effective both radially and axially and in each case in opposing directions, a circumferential round weld is made orbitally, starting from a tube support plate of the tube support plates and the tube inner bore, in a single pass and continuously from radially inside to radially outside, a weld width of the circumferential round weld covers at least one axial form fit depth of the first form fit, and the circumferential round weld is positioned such that the weld width engages in the tube support plate at most by an axial form fit depth, when viewed from a side of the inner tube.

5. A product-to-product shell-and-tube heat exchanger comprising at least one tube bundle that is welded in each case according to claim 3.

6. An auxiliary device for a method for producing welded connections between inner tubes and a tube support plate of a tube bundle for a product-to-product shell-and-tube heat exchanger, wherein the welded connection is designed such that:

an inner tube of the inner tubes, with its tube inner bore, is connected to an end face of the tube support plate that faces the inner tubes in a plane perpendicular to an inner tube longitudinal axis, which tube support plate comprises a plate inner bore, and wherein the tube support plate is disk-shaped;

the tube inner bore and the plate inner bore have inner diameters of equal size and are oriented so as to be aligned with one another, in an unwelded starting position, the inner tube and the tube support plate are fixed to one another by means of a first form fit, which is effective both radially and axially and in each case in opposing directions, a circumferential round weld is made orbitally, starting from the tube support plate and the tube inner bore, in a single pass and continuously from radially inside to radially outside; and a weld width of the circumferential round weld covers at least one axial form fit depth of the first form fit, wherein:

a first holding ring half and a second holding ring half define holding ring halves and together form a closed ring, the holding ring halves touch in a parting plane that extends through a center of the auxiliary device, and the holding ring halves form a non-displaceable second form fit in the parting plane, the tube support plate establishes a tube layout pattern for arrangement of inner tubes arranged in parallel with one another by defining more than one plate inner bore, the tube layout pattern is reproduced in the holding ring halves in such a way that the inner tubes arranged so as to be evenly distributed around a single pitch circle are in each case enclosed at most by one half by the holding ring halves, wherein an opening of relevant enclosing contour faces the center, the parting plane additionally extends through at least one inner tube longitudinal axis lying on the single pitch circle, holding means engage displaceably in the holding ring halves in each case on a periphery of the holding ring halves and in a star shape oriented towards the center, the holding means are in each case tangent on both sides to adjacent inner tubes arranged on the single pitch circle, and if necessary, the holding means fix an inner tube of the inner tubes that is arranged in the center by means of their relevant end face facing the center and are in each case detachably fixed in this position themselves.

7. The auxiliary device according to claim 6, wherein the second form fit fixes the first holding ring half and the second holding ring half to one another in the radial direction.

8. The auxiliary device according to claim 6, wherein the holding means are in each case fixed in the first holding ring half or the second holding ring half by securing means.

9. The auxiliary device according to claim 6, wherein the first holding ring half and the second holding ring half are detachably interconnected by connection means that are arranged on a periphery of the first holding ring half and the second holding ring half so as to be diametrically opposite one another.

10. The auxiliary device according to claim 6, the inner tubes comprise seven inner tubes, wherein one inner tube is located coaxially in the center and six inner tubes are arranged to be evenly distributed around the single pitch circle, and the parting plane additionally extends through two diametrically opposed inner tubes of the inner tubes.

11. A tube bundle for a product-to-product shell-and-tube heat exchanger, welded using the auxiliary device according to claim 6.

* * * * *